United States Patent [19]

Ries

[11] Patent Number: 5,049,196

[45] Date of Patent: Sep. 17, 1991

[54] METHOD OF WETTING A CEMENT OR GYPSUM-BONDED FIBROUS MIXTURE OF BUILDING MATERIALS

[75] Inventor: Hans B. Ries, Hardheim, Fed. Rep. of Germany

[73] Assignee: Maschinenfabrik Gustav Eirich, Hardheim, Fed. Rep. of Germany

[21] Appl. No.: 341,049

[22] Filed: Apr. 20, 1989

[30] Foreign Application Priority Data

Apr. 21, 1988 [DE] Fed. Rep. of Germany ....... 3813341

[51] Int. Cl.$^5$ .......................... C04B 7/00; C04B 11/00
[52] U.S. Cl. ..................................... 106/672; 106/646; 106/650; 106/653; 106/674; 106/680; 106/711
[58] Field of Search ...................... 106/86, 88, 99, 646, 106/650, 653, 674, 680, 711, 672

[56] References Cited

U.S. PATENT DOCUMENTS

| | | | |
|---|---|---|---|
| 3,834,918 | 9/1974 | Uogaeshi | 106/86 X |
| 4,303,450 | 12/1981 | Hacker | 106/99 X |
| 4,751,024 | 6/1988 | Shu et al. | 106/99 X |
| 4,871,395 | 10/1989 | Sugama | 106/88 |

OTHER PUBLICATIONS

*The condensed Chemical Dictionary*, by Hawley 1971, p. 430.

*Primary Examiner*—Karl Group
*Attorney, Agent, or Firm*—Michael L. Dunn

[57] ABSTRACT

A simple and inexpensive method of wetting a cement or gypsum-bonded fibrous mixture of building materials using water is characterized in that the water is added to the mixture of building materials at least partially in the form of a foam containing at least one foam forming surfactant and at least one foam stabilizer, or is added to the mixture of building materials in combination with at least one foam forming surfactant and at least one foam stabilizer prior to foam formation, and then at least partially foamed in situ, such that a sufficient quantity of water is present in the mixture to provide a final mixture exhibiting a powdery-crumbly consistency.

7 Claims, No Drawings

METHOD OF WETTING A CEMENT OR GYPSUM-BONDED FIBROUS MIXTURE OF BUILDING MATERIALS

Various cement or gypsum-bonded fibrous mixtures of building materials have to be wetted with water in a mixer but frequently this can lead to pebbling, since the hydraulic binders cement and gypsum have a high affinity to water. Such pebbling, which occurs particularly in the case of building materials which in addition to the hydraulic binder also contain organic or inorganic fibers such as paper fibers, interferes with the further processing of the mixture of building materials and adversely affects the quality of the end product. If only the fibers are pre-wetted with water, then pebbling can likewise occur by reason of a compaction and felting effect.

In order to avoid such pebbling, it is known for the water to be sprayed through jets in a very finely dispersed form as a mist which is introduced into a high speed mixer. Such a method is very expensive and entails the risk of the mixer becoming contaminated by the fluidized wet dust particles which form.

Another known method of avoiding the said pebbling resides in adding the water to the mixture of building materials in the form of a snow. This method, too, is expensive and cost-intensive, since it calls for an additional plant for producing the snow.

The problem on which the invention is based thus resides in avoiding the disadvantages of the prior art wetting methods and suggesting a simple and less expensive method of wetting mixtures of building materials, particularly mixtures consisting of fibers and water, particularly with added gypsum or cement, such as cement-paper fiber mixtures.

The method according to the invention, for wetting a cement or gypsum-bonded mixture of building materials by means of water is characterized in that the water is added to the mixture of building materials at least partially in the form of a foam containing at least one foam forming surfactant and at least one foam stabilizer, in a sufficient quantity to provide a final mixture having a powdery-crumbly consistency. In the alternative, water containing at least one foam-forming surfactant and at least one foam stabilizer may first be added to or brought into contact with the mixture of building materials and then transformed, in whole or in part, to a foam in situ, by suitable means to insure that the moisture content of the mixture is achieved and/or maintained.

This method effectively avoids localized over-wetting of the mixture which is the cause of pebbling.

The water is therefore added to the mixture of building materials only in such a quantity that the wetted end product has no liquid or pourable consistency but remains powdery-crumbly and while in this form can be pressed into moulded shapes. The quantity of water needed to achieve this end result may vary and will depend upon the mixture of building materials, since these are able to accommodate varying quantities of water. When the mixture of building materials is blended with the foam, the foam is largely broken down.

There are processes in which the fibers are partially wetted, the binder being incorporated in the moulding plant. There may also be cases in which the density and pore content of the mixture can be regulated by the application of a vacuum mixer.

The water does not need to be completely converted to foam form or to be changed to the foam form while it is in the mixer.

Expediently, the foam is produced separately without coming in contact with the mixture of building materials and is only subsequently blended with the mixture of building materials. Ideally, it will be sprayed in alone or together with water or high-pressure jets. Also the cleaning water required for cleaning the mixer can be sprayed in via such high pressure jets. Also a part of the water required for damping down can as such be injected through high pressure jets while the remainder is added in foam form by a quite separate apparatus.

The mixer used for blending the mixture of building materials and the foam can work in a vacuum just as well as in the over-pressure range. In the latter case, the over-pressure should prevent air emerging from the mixture.

Foam can be generated in various per se known ways, such as by the insufflation of a gas, particularly air, into the water containing the foam forming surfactant and foam stabilizers or by violent percussion, shaking, spraying or stirring of the water containing the surfactant and foam stabilizers in the relevant gas atmosphere. Expediently, the foam is continuously produced in a per se known foam generating plant and pumped into the mixer containing the mixture of building materials. This facilitates the supply since the draw-off and transfer of batch-wise produced foam into the mixer may present problems. Therefore, where foam generation is concerned, it is expedient to proceed by first dissolving the surfactant and foam stabilizers in the water which is then foamed in a suitable continuously operating apparatus by the insufflation of air, the foam thus formed being transferred directly to the mixer which contains the mixture of building materials. For producing the foam in a separate apparatus, it is expedient when producing the foam to maintain a temperature of 15 to 50 and preferably 20° to 40° C. In the case of multi-stage mixing operations, a multi-stage addition of foam may be required.

If the foam is to be produced in the mixer while the mixing operation is taking place, then stationary or rotary lances can blow air into the mixer.

Ideally, the water should be added to the mixture of building materials in a foamed condition, the water being foamed up to eight to twenty times and preferably ten to fifteen times its fluid volume. The wetting process according to the invention can be carried out batch-wise or continuously by multi-stage operation in one or two mixers. The continuous procedure is preferable.

As surfactants or foam-forming agents, it is possible to consider conventional interface-active substances such as are already known as agents for forming foam in water.

Suitable anionic surfactants are for example soaps, alkyl sulfonates, olefin sulfonates, ester sulfonates, alkylaryl sulfonates and in particular alkylbenzene sulfonates such as dodecylbenzene sulfonate and alkylnaphthalene sulfonates, alkyl sulfates, ether sulfates and fatty alcohol (ether) sulfates.

Usable cationic surfactants are for example straight-chain and cyclic ammonium compounds, benzalkonium chlorides and quaternary ammonium salts, amino salts and pyridinium salts.

Suitable nonionic surfactants are for example polyethers, particularly alkyl phenol polyglycol ethers and other products of ethoxylation of fatty acids, fatty acid amides, fatty amines and fatty alcohols as well as amino oxides and fatty acid esters of polyalcohols.

Usable ampholytic surfactants which as zwitterions combine anion-active and cation-active hydrophilic groups are for example glycerine derivatives having a betaine structure, and also sulfobetaines.

Also the foam stabilizers are known as such, such as for example from the production of washing agents and are compounds which are added in small quantities to washing-active substances in order to prevent excessively rapid collapse of the foam. Generally, these are viscosity-enhancing compounds. Examples are fatty acid alkanolamides and cellulose ethers such as methyl, ethyl or carboxymethyl cellulose, but also any desired other known foam stabilizers may be used such as alginates, polyvinyl alcohol, dextrine or gelatines which are suitable for maintaining the stability of the foam in aqueous solutions for a sufficiently long time such as is necessary for blending with the mixtures of building materials. Expediently used foam stabilizers are, in particular, cellulose ethers.

The method according to the invention affords advantages in the case of any desired cement or gypsum-bonded mixtures of building materials, but particularly mixtures of building materials which in addition to the hydraulic binder cement or gypsum, particularly gypsum, contain fiber substances of organic or inorganic origin, because such mixtures have a particular tendency towards pebbling. The fibers of such mixtures of building materials may be mineral fibers such as rock fibers or glass fibers or they may be fibers of organic origin such as synthetic plastic fibers or cellulose fibers. The method according to the invention is particularly suitable in the application for the wetting of gypsum-paper fiber mixtures.

EXAMPLES

1. Procedure for batch mixing:

|   |   |
|---|---|
| 100 kg gypsum |   |
| 20 kg paper fiber |   |
| 36 kg foam $\underline{A}$ about 300-400 l |   | produced by the addition of 1% surfactant and 0.5% carboxymethyl cellulose.

The foaming factor amounts to about 9-11

|   |   |
|---|---|
| Mixer charge fiber | 20 secs |
| Mixer charge gypsum | 10 secs |
| Dry mixing | 30-60 secs |
| Foam addition | 120 secs |
| Ready mixing | 60 secs |
| Emptying | 30 secs |

|   |   |
|---|---|
| Total time | 270-300 secs |

2. Continuous mixing process.

Continuous fibers and dispensing of binding agent in one Contimixer.

The foam is added in the second part of the through-flow mixer or in a second through-flow mixer which is installed on the downstream side.

3. Separate fiber wetting with foam in a batch or through-flow mixer. Recipe:

|   |   |
|---|---|
| Gypsum | 60 kg |
| Paper fiber | 12 kg |
| Foam | 24 kg $\underline{A}$ 200-260 l |
| Batch process, mixer loading fibers | 20 secs |
| Loosening up of fiber | 20 secs |
| Foam addition | 120 secs |
| Emptying | 30 secs |
| Total time | 190 secs |

The binder is worked in in the moulding plant.

4. Continuous method

Continuous fiber addition in a continuous mixer with the continuous addition of foam preferably over the entire length of the mixer.

What is claimed is:

1. A method of wetting a dry mixture of hydraulic cement or gypsum, fiber containing, building materials by means of water, which comprises contacting the mixture of building materials with aqueous foam in a sufficient quantity to provide a final mixture having a powdery-crumbly consistency and blending the resulting mixture of building materials and foam until the foam is at least partly broken down, said foam containing at least one foam forming surfactant and at least one foam stabilizer.

2. A method according to claim 1, wherein initially the foam forming surfactant and the foam stabilizer are dissolved in water and then foamed by the insufflation of air.

3. A method according to claim 2, wherein the water is added in a range of about 8 to 20 times its fluid volume, in foam form.

4. A method according to claim 3, wherein the foam stabilizer is selected from the group consisting of a cellulose ether, an alginate, a polyvinyl alcohol, a dextrine and a gelatin.

5. A method according to claim 4, wherein the foam used is at a temperature of about 15° to 50°.

6. A method according to claim 5, wherein the foam and the water are blown by high pressure jets into a mixer containing the mixture of building materials.

7. A method according to claim 6, wherein the fibrous mixture of building materials comprises a mixture of cement and paper fibers.

* * * * *